Dec. 11, 1923.

A. STUCKI

ROLLER SIDE BEARING

Filed Feb. 28, 1922

1,477,195

INVENTOR
Arnold Stucki
by Bakewell & Brown
his Attys.

WITNESSES
J. Herbert Bradley.

Patented Dec. 11, 1923.

1,477,195

UNITED STATES PATENT OFFICE.

ARNOLD STUCKI, OF PITTSBURGH, PENNSYLVANIA.

ROLLER SIDE BEARING.

Application filed February 28, 1922. Serial No. 540,021.

*To all whom it may concern:*

Be it known that I, ARNOLD STUCKI, a citizen of the United States, and a resident of Pittsburgh, in the county of Allegheny and State of Pennsylvania, have invented a new and useful Improvement in Roller Side Bearings, of which the following is a specification.

This invention relates to anti-friction side bearings for railway cars and has for its objects the provision of a bearing of this type in which the roller is self-centering, in which the liability of the roller developing flat spots or recesses on its circumference, or the track upon which the roller runs becoming rough or recessed, thus interfering with the free travel of the rolling element, is prevented, and in which the roller gravitates to the center of its track under its own weight immediately after contact between the wear-plate upon the car body and the roller is broken, that is, as soon as the body of the car lifts sufficiently to break contact with the roller.

A further object of the invention is to provide a side bearing which obviates the necessity of using any special devices for moving the roller, either into operative or inoperative positions.

Special objects of the invention are to provide a bearing having a self-centering free roller of conical form; to provide a bearing in which the thrusts, due to the impact of the car body upon the roller while in its normally centered position will not be entirely thrown upon the trunnions supporting the roller but will be partially thrown upon the roller body as well; to provide a bearing in which the roller will tend toward the longitudinal axis of the truck while inoperative, whereby to compensate for any lateral movement thereof frequently produced just after contact of the body wear-plate with the roller; to provide a bearing which permits a turning movement of the roller under excessive swivelling of the car body, regardless of the fact that its length of travel is confined within predetermined limits; and to provide a bearing which is self-cleaning under normal operating conditions.

These and other objects of the invention will more readily appear when taken in connection with the following description and the appended claims.

Figure 1:
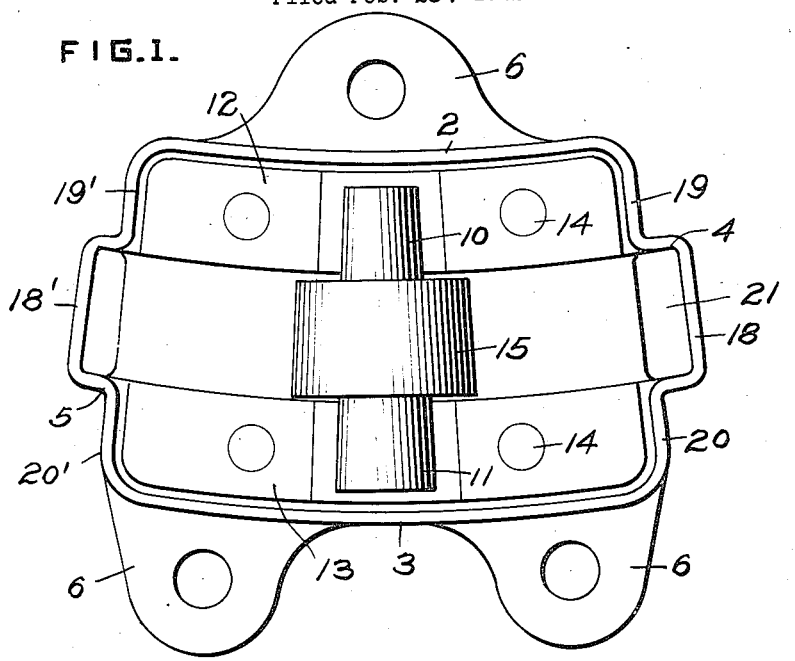
Figure 2:
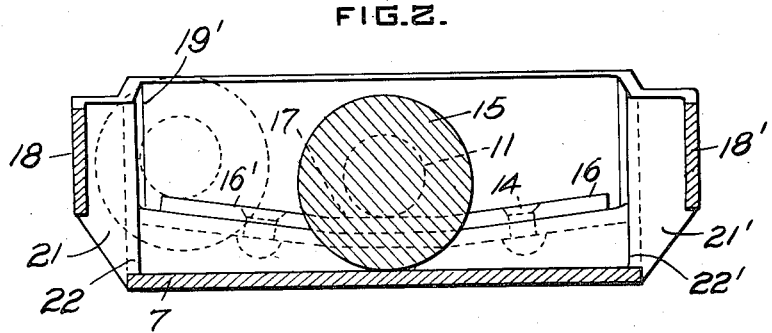

In the accompanying drawings, Fig. 1 is a plan view illustrating the preferred embodiment of the invention; Fig. 2, a longitudinal transverse sectional view of the bearing illustrated in Fig. 1; and Fig. 3, a vertical transverse sectional view thereof with parts in elevation.

The bearing comprises a cage or housing having a bottom 1, side walls 2, 3, and end walls 4, 5, and extending from the housing are ears or lugs 6 provided with holes for receiving bolts or rivets for connecting the bearing to the bolster of the truck.

The bottom of the cage or housing is depressed at its longitudinal central portion forming a channel as indicated at 7, and at its opposite sides thereof is provided with bearing surfaces or run-ways 8 and 9 upon which the respective trunnions 10 and 11 of the roller ride. Preferably these run-ways 8 and 9 are equipped with suitable wear plates shown at 12 and 13, attached in any suitable manner as by riveting as indicated at 14.

The bearing surfaces for the trunnions, also the depressed channel 7 and the side walls 2 and 3 of the housing are arcuate so as to conform to the path of travel of the conical roller employed. The lines of the conical surfaces of the trunnions 10 and 11 and the body portion 15 of the roller converge to the theoretical center of oscillation of the truck, while the inclination of the upper surface of the wear plates 12 and 13 and of the depressed portion 7 vary to suit that of the trunnions and body 15, respectively, so as to assure the maximum line of contact, and greatest distribution of strains.

The run-ways 8 and 9 slope downwardly from their extremities to a straight intermediate portion which is disposed more nearly in a horizontal plane, while the depressed portion 7 lies in a single plane throughout its entire extent. The form of the run-ways is clearly illustrated in Fig. 2 in which 16, 16' and 17 designate respectively the end and intermediate portions of one of the run-ways. It is thus obvious that the roller when free to move under its own weight will gravitate to the intermediate portions of the run-way which are of appreciable length.

As previously pointed out, all portions of the depressed channel 7 lie in the same plane, and the channel is preferably disposed at such distance below the run-ways 8 and 9 that the body 15 of the roller will touch the same throughout its region lying directly beneath the intermediate portions 17 of the run-ways without lifting the trunnions out of contact with their bearing surfaces, but as soon as the trunnions reach the upwardly inclined extremities 16, 16' they will lift the body 15 out of contact with the channel.

Figure 3:
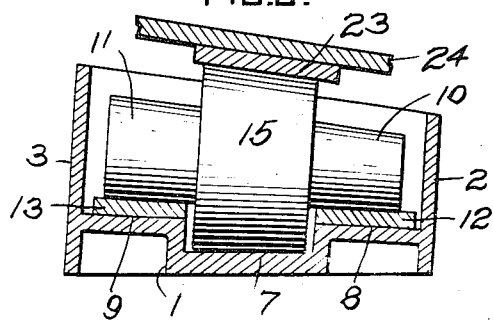

In order to cause the roller 15 to tend towards the walls 2 and the center of the truck, the outer run-way 9 is positioned at a slightly higher elevation than the inner run-way 8, as clearly shown in Fig. 3.

The end walls 4 and 5 are offset throughout their central portions 18, 18' in alignment with the channel 7, providing limiting abutments 19, 19' and 20, 20' with which the trunnions contact when they reach the limits of their travel upon the run-ways, as clearly shown by the dotted line position of the roller in Fig. 2, the offsets 18, 18' being of such dimensions as to embrace but leave a slight space beyond the body 15 when in such position. The lower parts of the offsets are open at 21 and 21' so as to prevent accumulation of dirt or foreign substances therein, and to serve as exits for any foreign substances deposited within the channel 7 from the bearing surfaces, finding their way through the openings 22, 22'. The body portion 15 of the roller cooperates in the usual manner with a wear plate 23, suitably attached to the body bolster 24.

The operation of the bearing is as follows: The roller normally rests with its trunnions upon the intermediate portions of the run-ways and the body portion 15 upon the surfaces of the depressed channel 7, to which position it is free to gravitate under its own weight. Whenever the car body sways sufficiently, the upper bearing plate 23 is brought into contact with the roller, and any swivelling movement of the truck will cause the roller to ride up on the inclined end portion 16, 16' of the run-ways. As soon as the body lifts, contact between the bearing plate 23 and the roller is broken, permitting the roller to gravitate under its own weight back to the intermediate portions 17 of the run-ways. The return of the roller occurs immediately upon the lifting of the car body and without the use of any auxiliary mechanism or parts. This quick return due to the lack of all lost motion devices is found to be of great importance in practical use, and in applicant's device is secured by a very simple construction.

Due to the fact that the central intermediate portions 17 of the run-ways are of appreciable length, the roller will not always come to rest at the same point, but at various points throughout their lengths, and will rest upon various parts of its own peripheries, thus assuring substantially uniform wear of both the bearing plates and the roller. Besides, the roller itself when thrown against the end walls by severe end shocks will rotate somewhat to present new lines of contact. Also due to the fact that the body of the roller contacts the depression 7 when in centered position, the strains and shocks due to the impact caused by the bearing plate 23 contacting the roller are distributed throughout the body of the roller as well as the trunnions, thus prolonging the life of the parts and assuring a decidedly smoother operation.

The length of the walls of the cage or housing are of such dimensions as to properly retain the roller upon the bearing surfaces, and the offsets 18, 18' are of such proportions that should the roller travel the entire length of the run-ways in either direction the trunnions will be brought into contact with the abutment walls flanking the offset portions. After the trunnions have contacted these walls any further swivelling movement of the truck will merely result in a turning movement of the roller, and the body 15 of the roller is maintained out of contact with the offset walls in order to reduce friction to a minimum during such operation.

It is well known that in practical operation when the body wear plate first contacts the roller in a bearing of this type, that the roller is forced laterally away from the center of the truck for a short distance. In order to counteract the disadvantages arising therefrom, the outer run-way 9 is positioned at a somewhat higher elevation than the inner run-way 8 so that the roller will tend towards the wall 2 and the center of the truck while free, and when subsequently moved outwardly following contact with the plate 23 will be properly located centrally of the run-ways.

All dirt and foreign substances upon the run-ways gradually work their way towards the channel 7 and escape through the discharge openings 22, 22'.

It is thus seen that the construction described provides a bearing which is simple and easy to repair, durable, inexpensive to manufacture, is quickly responsive and self-centering, which compensates for lateral movement of the roller due to initial contact with the upper bearing plate, and which distributes the strains due to impacts throughout a large area including the body of the roller.

I claim:

1. A side bearing for railway cars comprising a cage having inner and outer side walls, end walls, and a bottom wall the floor of which has a depressed central portion and inner and outer lateral bearing portions adjacent the inner and outer side walls respectively, a free roller provided with trunnions resting at all times upon the lateral bearing surfaces, the diameter of the body of the roller being such as to contact the depressed floor portion only when in its centered position and the outer lateral bearing portion being disposed at a higher elevation than the inner one whereby to cause the said roller to normally tend towards the said inner side wall.

2. A side bearing for railway cars comprising a cage having bottom, side and end walls, the bottom having a straight longitudinal depressed portion and lateral bearing surfaces adjacent thereto, a free roller provided with rigidly attached trunnions disposed within the cage with its body portion extending into the depression and its trunnions riding at all times upon said bearing surfaces to constantly support the roller, said bearing surfaces having intermediate straight central portions and extremities which slope upwardly therefrom to render the roller self-centering, the depressed portion of the bottom being spaced at such distance below the bearing surfaces as to cause the body of the roller to contact the same only while in centered position without lifting the trunnions from said intermediate portions, the outer lateral bearing surface being slightly higher than the inner one, whereby the said roller tends towards the inner side wall of the cage.

3. A side bearing for railway cars comprising a cage having bottom, side and end walls, the bottom having a longitudinal depressed portion and arcuate run-ways, a conical roller provided with rigidly attached trunnions freely mounted in the cage with the body of the roller within the depressed portion and the trunnions resting at all times upon the run-ways to constantly support the roller, the extremities of said run-ways sloping downwardly towards central intermediate portions to render the roller self-centering, the depressed bottom portion being spaced at such distance below the intermediate portions of the run-ways as to permit the body of the roller to touch the depressed portion only while in centered position, the outer run-way being slightly higher than the inner run-way whereby the said roller tends to hug the inner side wall of the cage.

In testimony whereof, I sign my name.
ARNOLD STUCKI.

Witness:
EDWIN O. JOHNS.